United States Patent
Garg

(10) Patent No.: US 10,117,173 B2
(45) Date of Patent: Oct. 30, 2018

(54) OUT-OF-BAND POWER DOWN NOTIFICATION

(71) Applicant: Parallel Wireless, Inc., Nashua, NH (US)

(72) Inventor: Sumit Garg, Hudson, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/923,392

(22) Filed: Oct. 26, 2015

(65) Prior Publication Data

US 2016/0119867 A1 Apr. 28, 2016

Related U.S. Application Data

(60) Provisional application No. 62/069,036, filed on Oct. 27, 2014.

(51) Int. Cl.
*H04W 52/02* (2009.01)
*H04L 12/40* (2006.01)

(52) U.S. Cl.
CPC ........... *H04W 52/0206* (2013.01); *H04L 2012/40215* (2013.01); *H04L 2012/40273* (2013.01); *Y02D 70/1224* (2018.01); *Y02D 70/1242* (2018.01); *Y02D 70/1262* (2018.01); *Y02D 70/142* (2018.01); *Y02D 70/144* (2018.01);
(Continued)

(58) Field of Classification Search
CPC ... H04L 2012/40215; H04L 12/40039; H04W 52/0206; H04W 68/02
See application file for complete search history.

(56) References Cited

U.S. PATENT DOCUMENTS

| 5,200,688 A * | 4/1993 | Patino ............... H02J 7/0031 307/10.7 |
| 8,645,014 B1 * | 2/2014 | Kozlowski ............ H04M 3/487 455/404.1 |
| 9,641,237 B2 * | 5/2017 | Akhtar ............... H04B 7/15528 |

(Continued)

FOREIGN PATENT DOCUMENTS

WO 2014034710 A1 3/2014

OTHER PUBLICATIONS

Automotive Central Body Controller, Texas Instruments, retrieved Oct. 21, 2014, http://www.ti.com/solution/automotive_central_body_controller#.

(Continued)

*Primary Examiner* — Rina C Pancholi
(74) *Attorney, Agent, or Firm* — Michael Saji; Keyur Parikh

(57) ABSTRACT

A mobile base station is disclosed, comprising: a vehicle bus notification module; an access interface for communicating with a mobile device; a backhaul interface for communicating with an operator core network; and a processor, in communication with the vehicle bus notification module, the access interface, and the backhaul interface, further comprising instructions that, when executed by the processor, perform steps comprising: receiving a vehicle bus low power alert at the vehicle bus notification module; and sending a message via the backhaul interface to the operator core network to request a notification to be sent to the mobile device regarding power off of the mobile base station.

18 Claims, 5 Drawing Sheets

(52) U.S. Cl.
CPC .......... *Y02D 70/146* (2018.01); *Y02D 70/162* (2018.01); *Y02D 70/164* (2018.01); *Y02D 70/22* (2018.01)

(56) References Cited

U.S. PATENT DOCUMENTS

| | | | | |
|---|---|---|---|---|
| 2002/0128051 | A1* | 9/2002 | Liebenow | H04M 1/72519 |
| | | | | 455/574 |
| 2008/0119191 | A1* | 5/2008 | Feigen | H04W 24/02 |
| | | | | 455/437 |
| 2008/0268833 | A1* | 10/2008 | Huang | H04B 7/024 |
| | | | | 455/425 |
| 2010/0159991 | A1* | 6/2010 | Fu | H04W 24/02 |
| | | | | 455/561 |
| 2010/0234071 | A1* | 9/2010 | Shabtay | H04B 7/0408 |
| | | | | 455/562.1 |
| 2011/0256880 | A1* | 10/2011 | Golaup | H04W 28/08 |
| | | | | 455/453 |
| 2013/0193753 | A1* | 8/2013 | Brey | B60R 16/0231 |
| | | | | 307/10.7 |
| 2014/0233412 | A1 | 8/2014 | Mishra et al. | |
| 2015/0282083 | A1* | 10/2015 | Jeong | H04W 52/0216 |
| | | | | 370/311 |

OTHER PUBLICATIONS

CAN bus, Wikipedia, the free encyclopedia (reversion of Oct. 18, 2014), retrieved Oct. 21, 2014, https://en.wikipedia.org/w/index.php?title=CAN_bus&oldid=630050767.

Vehicle bus, Wikipedia, the free encyclopedia (reversion of Oct. 15, 2014), retrieved Oct. 21, 2014, https://en.wikipedia.org/w/index.php?title=Vehicle_bus&oldid=629655938.

Motor Drive and Control Solutions, Texas Instruments, Brochure, 2013, http://www.farnell.com/datasheets/1810320.pdf.

TIDA-00296/SAT0103 E1.1 Test Report, Texas Instruments, retrieved Oct. 21, 2014, http://www.ti.com/lit/ug/tidu549/tidu549.pdf.

* cited by examiner

OUT-OF-BAND POWER DOWN NOTIFICATION

CROSS-REFERENCE TO RELATED APPLICATIONS

This application claims the benefit of priority to U.S. Provisional Patent Application No. 62/069,036, entitled "Out-of-Band Power Down Notification," filed on Oct. 27, 2014, the entire contents of which are hereby incorporated by reference for all purposes. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; U.S. patent application Ser. No. 14/183,176, entitled "Methods of Incorporating an Ad Hoc Cellular Network into a Fixed Cellular Network," filed Feb. 18, 2014; U.S. patent application Ser. No. 14/024,717, entitled "Heterogeneous Self-Organizing Network for Access and Backhaul," and filed on Sep. 12, 2013; U.S. patent application Ser. No. 14/146,857, entitled "Heterogeneous Self-Organizing Network for Access and Backhaul," and filed on Jan. 3, 2014; and U.S. patent application Ser. No. 14/571,250, entitled "Virtualization of the Evolved Packet Core to Create a Local EPC," filed on Dec. 15, 2014.

BACKGROUND

First responders and military personnel use communications channels to stay in contact in challenging situations. For example, firefighters may rely on radios to stay in contact with each other, with different team members supporting one or members inside of a building by monitoring the exterior of a building. U.S. patent application Ser. No. 14/183,176, incorporated herein in its entirety, provides an example of a mesh base station for providing services to first responders.

However, if a communications channel becomes unavailable or is turned off unexpectedly, the situation may become dangerous and potentially life-threatening for those relying on the communications channel. It is therefore desirable to have a communications channel that makes its users aware that the channel will become unavailable before the fact.

SUMMARY

An in-vehicle base station is disclosed that connects to a vehicle controller area network (CAN) bus. The CAN bus is monitored to determine what the electrical load is on the system and to determine what the current battery level is. When the battery level becomes close to a minimum threshold, the base station sends out an alert to one or more attached mobile devices to inform them that the base station is shutting down. The alert may be via an out-of-band channel.

In one embodiment, a mobile base station is disclosed, comprising: a vehicle bus notification module; an access interface for communicating with a mobile device; a backhaul interface for communicating with an operator core network; and a processor, in communication with the vehicle bus notification module, the access interface, and the backhaul interface, further comprising instructions that, when executed by the processor, perform steps comprising: receiving a vehicle bus low power alert at the vehicle bus notification module; and sending a message via the backhaul interface to the operator core network to request a notification to be sent to the mobile device regarding power off of the mobile base station.

In another embodiment, a method is disclosed, comprising: receiving, at an in-vehicle base station, a low power alert from a vehicle controller network; sending, at the in-vehicle base station, a request to a network server to message mobile devices attached to the in-vehicle base station informing the mobile devices that the in-vehicle base station will be powering down; and sending, from the network server, notifications to the mobile devices that the in-vehicle base station will be powering down.

The notifications may be short message service (SMS) messages. The method may further comprise requesting, from the network server, mobile device detach procedures for the mobile devices. The method may further comprise performing power control for neighboring nodes. The vehicle controller network may be a controller area network (CAN) bus. The request may include a projected time that the in-vehicle base station will be powered down.

DETAILED DESCRIPTION

Figure 1:
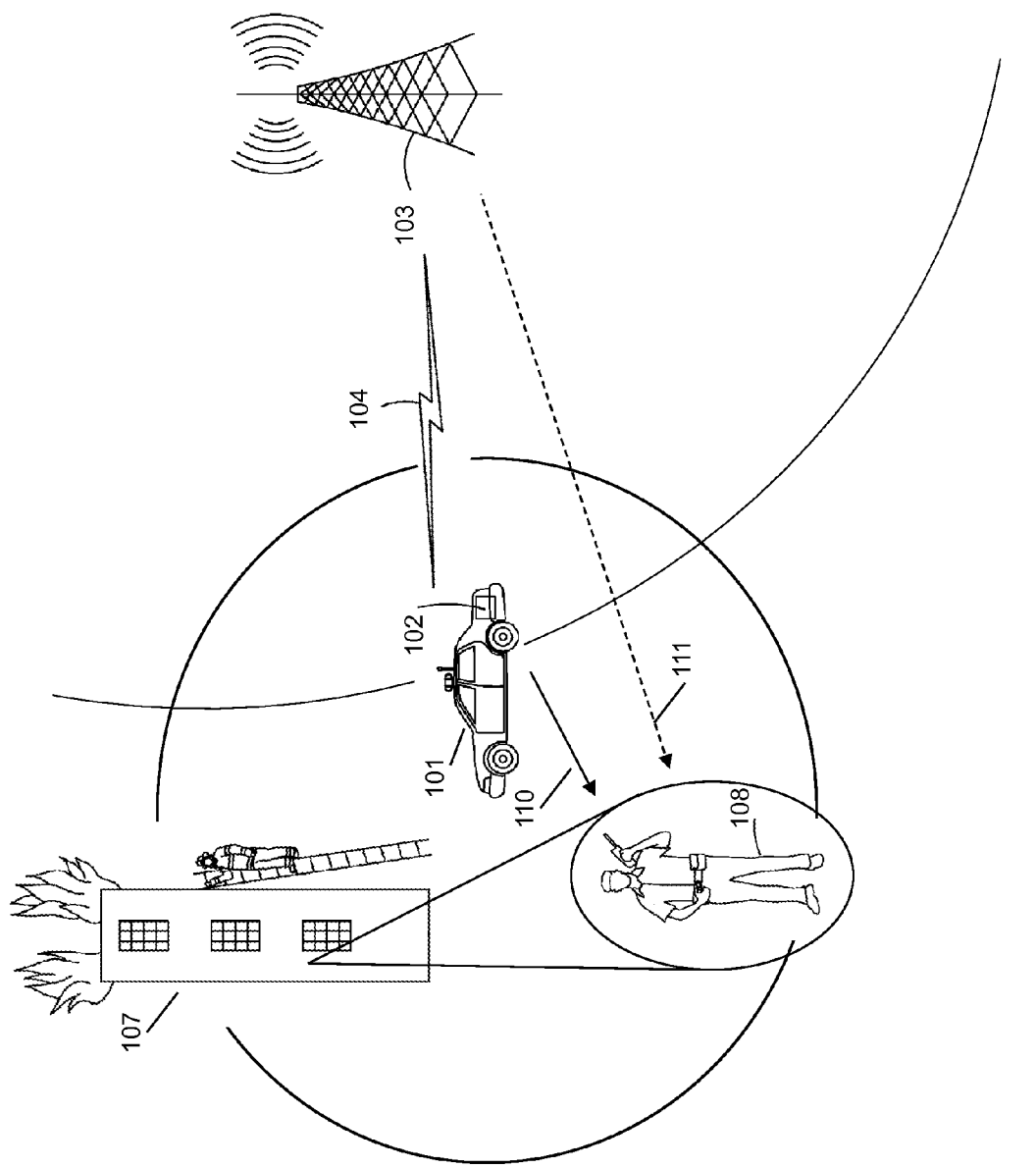
FIG. 1 is a schematic diagram of a deployment scenario, in accordance with some embodiments.

The CAN bus is a common low-speed serial bus used to allow various systems within a vehicle to communicate. The CAN bus is a message-based protocol, and has been standardized under the CAN Specification 2.0 Part A and B, hereby incorporated by reference herein in their entirety. Other in-vehicle buses may be used in place of the CAN bus, wherever the CAN bus is referred to below.

Vehicles typically provide central controller systems that monitor power loads, power current, voltage monitoring, and other power management functions. For example, the Texas Instruments TMS470 ARM Cortex-M Safety MCU controller provides connectivity to such functions and also to one or more CAN buses. Central controllers also provide monitoring of load and demand among distributed loads. The load monitoring system may provide monitoring of system power loads, which may be a direct battery connection.

In some embodiments, when battery level or voltage of one or more batteries goes below a desired threshold, a warning may be triggered at the load monitoring system, or at a load monitoring module in the in-vehicle base station. Monitoring of the battery may be performed as disclosed in, e.g., WO Pat. Pub. No. WO2014034710A1, by Iwai. Monitoring may be performed in the load monitoring system, or alternately, in parallel at the in-vehicle base station using information passed through the central controller, in some embodiments.

In some embodiments, the load monitoring system may be enabled to turn off nonessential systems, such as seat warmers and cigarette lighters, to reduce electrical load in certain situations. In some embodiments, the load monitoring system may keep the in-vehicle system powered on when powering off nonessential systems.

In some embodiments, the central controller may be substituted with another system that monitors a battery status, where the battery is a battery specifically coupled to the in-vehicle base station.

In some environments, thermal protection may be a concern. In some embodiments, the central controller may also monitor temperature, via, for example, sensors, of the battery, power subsystems, and other subsystems of the vehicle to determine whether the system is operating within desired operating parameters. When the temperature exceeds a particular threshold, the warning may be triggered as described elsewhere herein.

In some embodiments, a notification may be sent to one or more clients of the in-vehicle base station providing power management status for the in-vehicle base station, as described further below.

In some embodiments, the one or more clients may be 3GPP UEs attached to the in-vehicle base station via LTE or another mobile network protocol, or Wi-Fi client devices attached to the in-vehicle base station acting as a Wi-Fi access point. In some embodiments, the in-vehicle base station may be enabled to send notification to other systems on the network, such as an LTE core network, instead of directly to the attached UEs, and the mobile devices in the possession of the first responders may be enabled to receive the notification out of band via the core network instead of from the in-vehicle node directly. In the case that the mobile device is capable of using more than one wireless interface, an out-of-band interface not provided by the in-vehicle node may be used.

In some embodiments, the notification may be bridged in via an additional stream from the in-vehicle node utilizing Wi-Fi.

The notification may be a short message service (SMS), text message, IP-based notification, app notification, short-range radio notification, land mobile radio (LMR) notification, or another type of notification, in some embodiments. The notification may be sent directly by the in-vehicle node prior to shutting down, or by another network node.

The notification may be sent at intervals, providing updates on the power status of the in-vehicle node, in some embodiments. For example, notifications may be sent based on battery percentages ("5% remaining"); based on time remaining ("10 minutes remaining"); or an immediate power-down status ("The system is powering down"). The notification may include information about whether connectivity will continue ("You will have/will not have continued connectivity"). The notification may be a text notification or an audio notification.

In some embodiments, handovers may be initiated or performed either by the in-vehicle base station or by the core network when the low-power or no-power notification is sent, to provide seamless transitioning of access/connectivity to another cell. In some embodiments, when another network node capable of increasing transmit power is located in a nearby location, the transmit power of the other network node could be increased and the users could be handed over to the other network node.

FIG. 1 is a schematic diagram of a deployment scenario, in accordance with some embodiments. Emergency vehicle 101 has an in-vehicle base station 102 connected via wireless backhaul 104 to macro cell 103. Emergency vehicle 101 is on its way to disaster site 107, where it will permit mobile devices to attach, such as UE 108, held by a mobile user. As shown, the coverage area of macro cell 103 includes in-vehicle base station 102, which uses this coverage to obtain wireless backhaul connection 104.

In some embodiments, vehicle 101 may run out of battery power, making it unable to continue providing power to vehicle base station 102. In this case, vehicle 101's CAN bus may notify all devices in the vehicle that power will be turned off. Base station 102 may then attempt to notify UE 108. In some cases, base station 102 may notify UE 108 directly via path 110, and using a proprietary notification or by using a special notification application or application-layer protocol. However, if UE 108 is a typical UE, it may be enabled to receive notifications via text message. Base station 102 may instead request that a text message be sent to UE 108 from the core network directly, via path 111. Path 111 may involve the use of, e.g., another base station (in the case that base station 102 has been turned off) or base station 102 itself a core network SMS server; an IP SMS gateway; and a coordinating server to request the SMS via the IP SMS gateway for UE 108.

Figure 2:
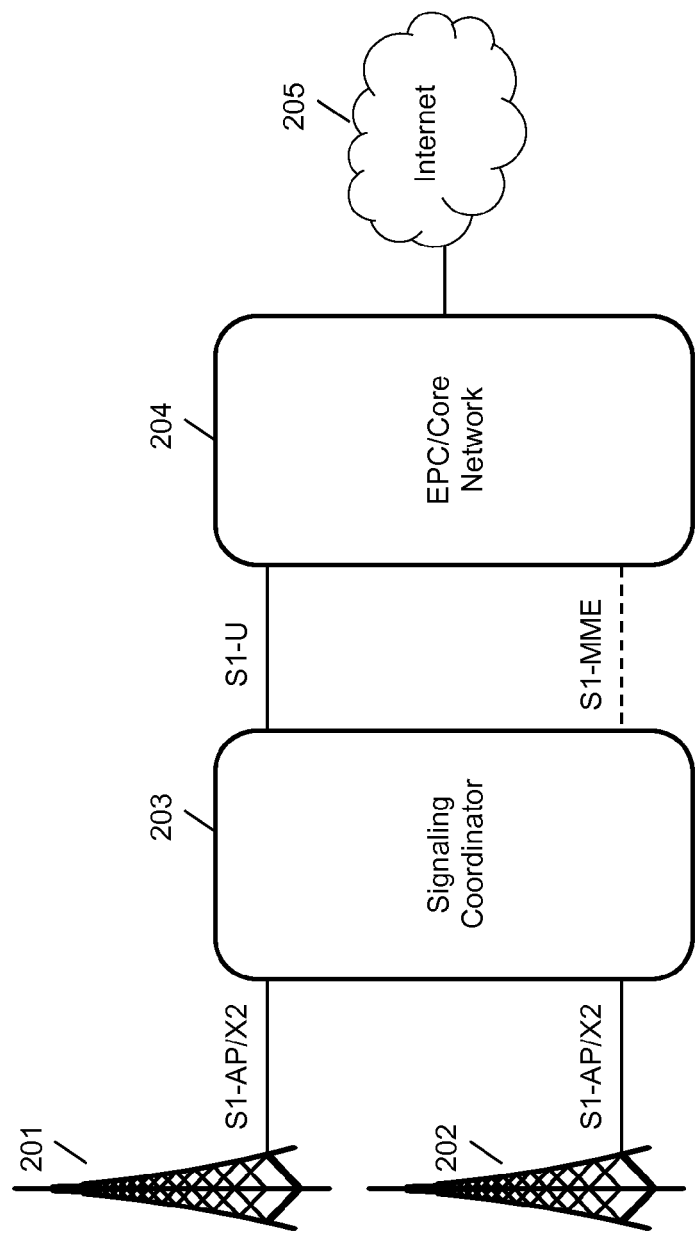
FIG. 2 is a system architecture diagram of an exemplary network configuration, in accordance with some embodiments.

FIG. 2 is a system architecture diagram of an exemplary network configuration, in accordance with some embodiments. Base stations 201 and 202 are connected via an S1-AP and an X2 interface to coordination server 203. Base stations 201 and 202 are eNodeBs, in some embodiments, and may be multi-RAT nodes in a heterogeneous network. Coordination server 203 is connected to the evolved packet core (EPC)/Core Network 204 via an S1 protocol connection and an S1-MME protocol connection. Coordination of base stations 201 and 202 may be performed at the coordination server. In some embodiments, the coordination server may be located within the EPC/Core Network 204. EPC/Core Network 204 provides various LTE core network functions, such as authentication, data routing, charging, and other functions. In some embodiments, mobility management is performed both by coordination server 203 and within the EPC/Core Network 204. EPC/Core Network 204 provides, typically through a PGW functionality, a connection to the public Internet 205.

Figure 3:
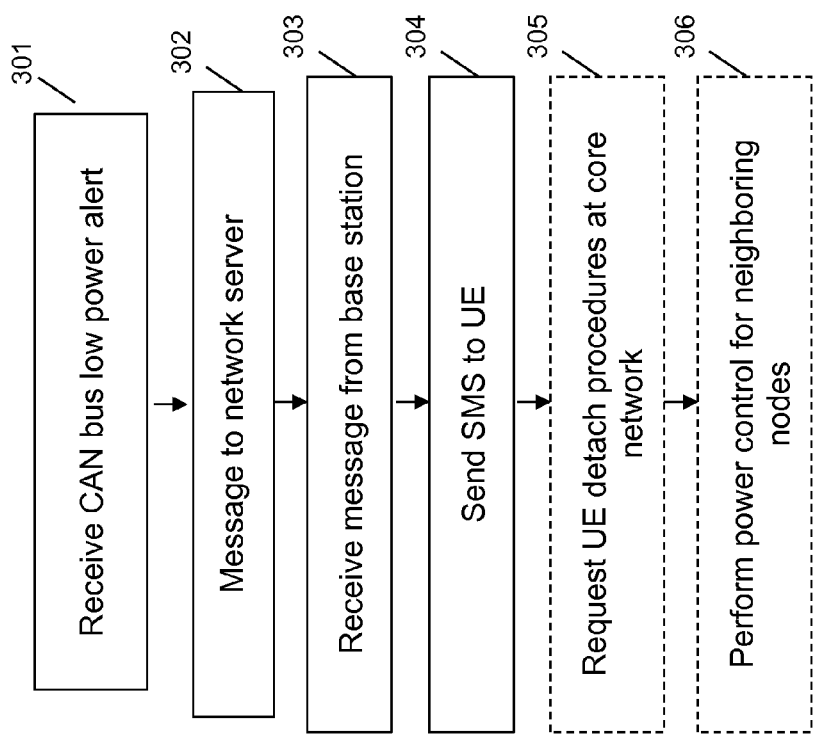
FIG. 3 is a flowchart of an out-of-band notification procedure, in accordance with some embodiments.

FIG. 3 is a flowchart of an out-of-band notification procedure, in accordance with some embodiments. The mobile base station described with reference to this figure is connected to a vehicle CAN bus. At step 301, the in-vehicle mobile base station receives a notification or alert from the CAN bus that the vehicle's battery has reached a low power state. This alert may come with a timeframe, in some embodiments, e.g., a time when a base station will be forced to shut down. In other embodiments, the mobile base station may determine, based on the alert, that it may be powered off at any time. In some embodiments, when no timeframe is provided but a battery level is provided, the base station may interpolate a time frame from the battery level. In some embodiments, a mobile base station may track the vehicle's battery itself and may initiate this step even prior to the vehicle CAN bus sending any notification that the vehicle is ready to power down the base station.

At step 302, the mobile base station may send a message to a network server to request that its UEs be notified that it will be powering down. The message may specifically identify its UEs, in some embodiments, or it may request that all UEs that are connected be notified; in the latter case, the network server is presumed to have already received any information needed about the UEs that are attached. In some embodiments, the network server may receive this information via an X2 message. In some embodiments, the message may include one or more of the following parameters:

notification text; identification text of the base station, for display to the user; identification or authentication of the base station; identification of one or more UEs to be notified via, e.g., phone number, international mobile equipment identifier (IMEI), international mobile subscriber identity (IMSI), media access control (MAC) address, or another means; and a timeframe, if available, for when the base station will be powered off (e.g., "Base station shutoff in 10 minutes" or "Base station going down immediately").

At step 303, the network server may receive the message from the base station. The network server may be a core network server, a gateway server between the base station and the core network, a coordinating server or proxy server, or another type of server. The network server may use the X2 protocol in communicating with the base station, and may also use the X2 protocol to communicate with other base stations or network nodes. The network node may use the S1 protocol to handle mobility communications with the core network. In some embodiments, the message at step 303 may be received, and then the network server may act as a proxy to initiate a text message request, either via an SMS gateway server, or directly by creating an SMS request. In some embodiments, a non-SMS text notification may be initiated, such as an Apple iMessage, iOS or Android push notification, or other notification.

At step 304, the SMS may be sent to the UE, either via the core network, or via the base station, or both. In the event that the base station is still alive, the message may be most conveniently and quickly delivered to the UE via the base station. In the event that the base station has been turned off, the UE will not receive the message until the UE has reconnected to another base station and mobility has been enabled at the target base station, which may take additional time, but may be the only option in some embodiments. SMS has good retry characteristics in the scenario where the base station is unexpectedly and immediately powered off; it will enable message redelivery after the UE has connected to a new base station. The UE may thus be notified in a timely manner, before base station power-down if possible or otherwise as soon as possible after base station power-down, that critical communications are no longer available.

At step 305, if the base station has powered down, the UE may be forcibly detached from the now-inactive base station from the core network.

At step 306, if the base station has powered down, or in preparation for the base station to power down, the network may be coordinated by a coordinating server to enable neighboring base stations to increase their transmission power, thereby extending their range to cover the gap in coverage created by the powering down of the first mobile base station. Any other power control or self-organizing network (SON) procedure may be initiated as necessary or desired.

Figure 4:
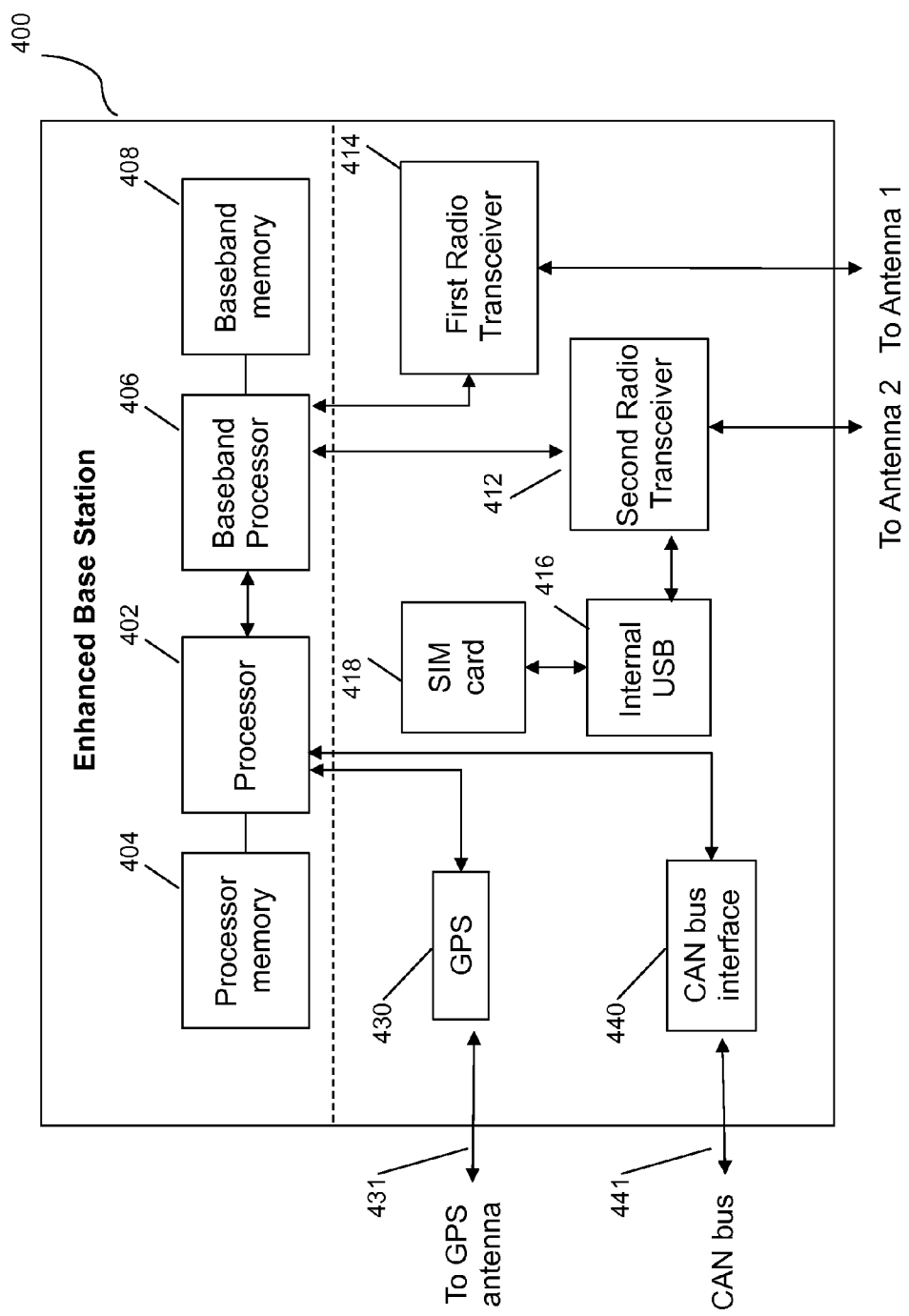
FIG. 4 is a schematic diagram of an enhanced base station, in accordance with some embodiments.

FIG. 4 is a schematic diagram of an enhanced base station, in accordance with some embodiments. Enhanced base station 400 may be an eNodeB for use with LTE, and may include processor 402, processor memory 404 in communication with the processor, baseband processor 406, and baseband processor memory 408 in communication with the baseband processor. Enhanced eNodeB 400 may also include first radio transceiver 410 and second radio transceiver 412, internal universal serial bus (USB) port 416, and subscriber information module card (SIM card) 418 coupled to USB port 414. In some embodiments, the second radio transceiver 412 itself may be coupled to USB port 416, and communications from the baseband processor may be passed through USB port 416.

In some embodiments, processor 402 may be coupled to a global positioning system (GPS) module 430. GPS module 430 may provide information to the processor regarding the location of the mobile base station. GPS module 430 may be connected to a GPS antenna 431 located outside the device, preferably on the top or roof of the exterior of a vehicle in which the base station is mounted, so that the GPS antenna can receive signals from GPS satellites. In some embodiments, the GPS module may provide AGPS functionality, and may cooperate with one or more other wireless modules, such as a Wi-Fi module, to obtain additional information. In environments where the use of the mobile base station is anticipated on a moving vehicle that is underground or out of sight of the sky, another positioning system may be used in conjunction with GPS/AGPS so that the position of the mobile base station may be ascertained at times when GPS is not available. For example, a subway train outfitted with a mobile base station may use other means, such as beacons on the track, to determine position. The position calculated by the GPS module 430 is processed by the processor 402, in some embodiments, to determine velocity. In some embodiments the GPS module can provide the velocity directly.

In some embodiments, processor 402 may be coupled to a CAN bus interface 440, which in turn may be coupled electrically to a vehicle CAN bus 441 of the vehicle in which the mobile base station is mounted. The CAN bus interface may monitor the CAN bus for vehicle-wide notifications, particularly power-related notifications. The CAN bus interface may also track and store battery information over time, and may also model the performance of the battery over time, so as to enable processor 402 to know if power down is imminent, even without an explicit notification from the vehicle power controller.

Processor 402 and baseband processor 406 are in communication with one another. Processor 402 may perform routing functions, and may determine if/when a switch in network configuration is needed. Baseband processor 406 may generate and receive radio signals for both radio transceivers 410 and 412, based on instructions from processor 402. In some embodiments, processors 402 and 406 may be on the same physical logic board. In other embodiments, they may be on separate logic boards.

The first radio transceiver 410 may be a radio transceiver capable of providing LTE eNodeB functionality, and may be capable of higher power and multi-channel OFDMA. The second radio transceiver 412 may be a radio transceiver capable of providing LTE UE functionality. Both transceivers 410 and 412 are capable of receiving and transmitting on one or more LTE bands. In some embodiments, either or both of transceivers 410 and 412 may be capable of providing both LTE eNodeB and LTE UE functionality. Transceiver 410 may be coupled to processor 402 via a Peripheral Component Interconnect-Express (PCI-E) bus, and/or via a daughtercard. As transceiver 412 is for providing LTE UE functionality, in effect emulating a user equipment, it may be connected via the same or different PCI-E bus, or by a USB bus, and may also be coupled to SIM card 418.

SIM card 418 may provide information required for authenticating the simulated UE to the evolved packet core (EPC). When no access to an operator EPC is available, local EPC 420 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 410 and 412, which may be Wi-Fi 802.11 a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 402 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may be used to perform the steps of FIG. 2 and may execute on the general purpose processor 402.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 410 and 412. Baseband processor 406 may use memory 408 to perform these tasks.

Figure 5:
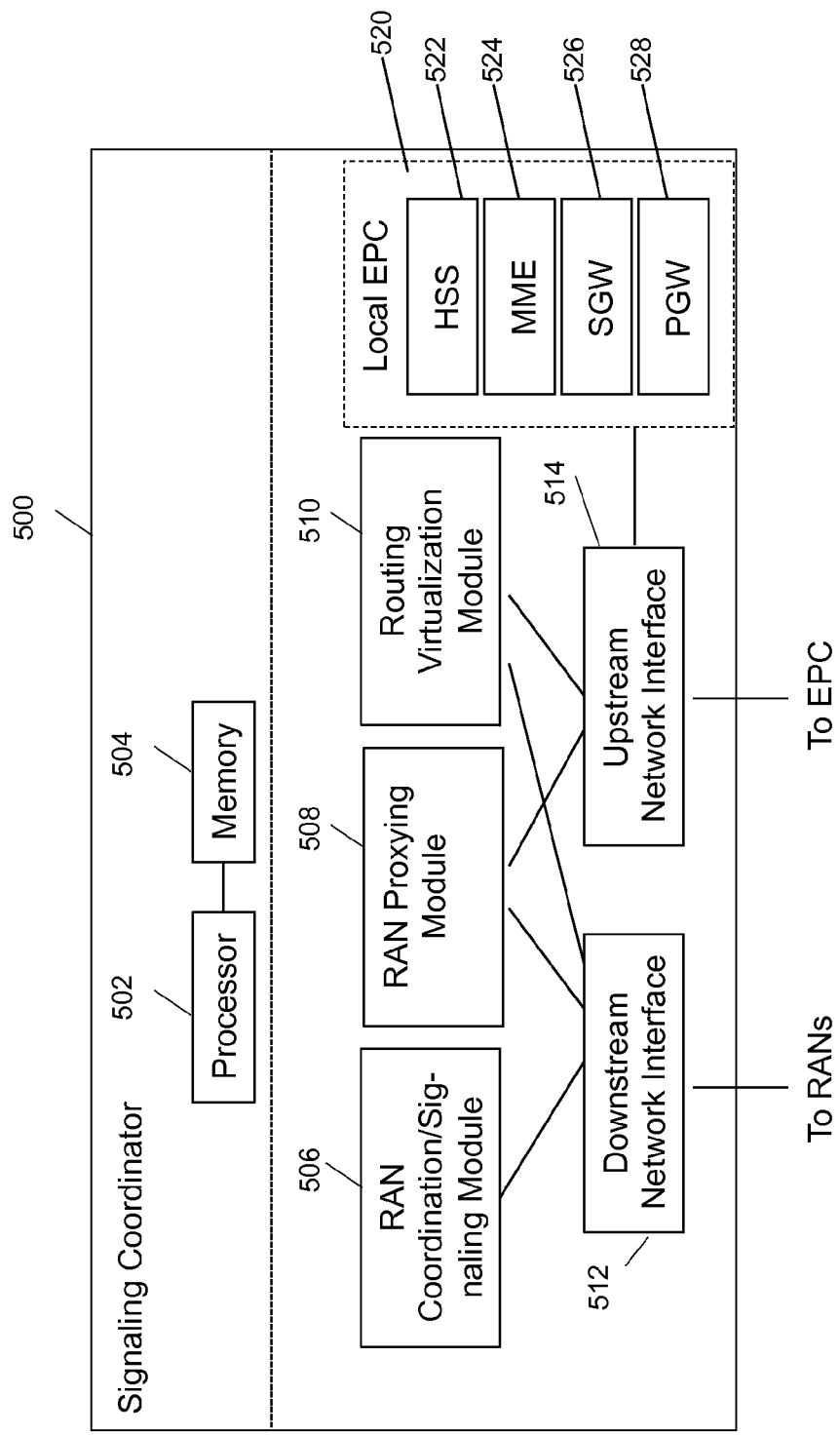
FIG. 5 is a schematic diagram of a signaling coordinator server, in accordance with some embodiments.

FIG. 5 is a schematic diagram of a signaling coordinator server, in accordance with some embodiments. Signaling coordinator 500 includes processor 502 and memory 504, which are configured to provide the functions described herein. Also present are radio access network coordination/signaling (RAN Coordination and signaling) module 506, RAN proxying module 508, and routing virtualization module 510. In some embodiments, coordinator server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet). Signaling storm reduction functions may be performed in module 506.

Signaling coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11 a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

In some embodiments, the software needed for implementing the methods and procedures described herein may be implemented in a high level procedural or an object-oriented language such as C, C++, C#, Python, Java, or Perl. The software may also be implemented in assembly language if desired. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A mobile base station for reducing coverage interruptions for users connected thereto, comprising:
   a vehicle bus notification module coupled to a vehicle electrical power system and configured to determine a vehicle battery power level, the vehicle electrical power system powering the mobile base station;
   a first radio access network interface for communicating with mobile devices using a first radio access technology;
   a backhaul interface for communicating with an operator core network;
   a processor, in communication with the vehicle bus notification module, the first radio access network interface, and the backhaul interface; and
   a memory, further comprising instructions that when executed by the processor, perform steps comprising:
      receiving a vehicle bus low power alert at the vehicle bus notification module;
      requesting, in response to receiving the vehicle bus low power alert, from a network server, a mobile device detach procedure for the mobile devices;
      sending, in response to receiving the vehicle bus low power alert, to the network server, a message to cause the network server to perform power control of a neighboring base station to increase or decrease transmission power; and
      sending a message via the backhaul interface to the operator core network to request a notification to be sent to the mobile devices, the notification configured to include human-readable information regarding the vehicle battery power level of the mobile base station,
      thereby enabling the mobile devices to be notified via the operator core network when the vehicle battery power level is low.

2. The mobile base station of claim 1, the steps further comprising requesting, from the operator core network, a mobile device detach procedure for the mobile devices and initiating a handover of the mobile devices in communication with the first radio access network interface to a neighboring base station.

3. The mobile base station of claim 1, wherein the vehicle bus notification module is coupled to a controller area network (CAN) bus.

4. The mobile base station of claim 1, wherein the notification includes a projected time that the mobile base station will be powered down.

5. A method, comprising:
   receiving, at an in-vehicle base station, a low power alert from a vehicle controller network regarding a vehicle battery power level of the in-vehicle base station;
   sending, at the in-vehicle base station, a request to a network server to message mobile devices attached to the in-vehicle base station informing the mobile devices that the in-vehicle base station will be powering down;
   requesting, in response to receiving the low power alert, from the network server, a mobile device detach procedure for the mobile devices;
   sending, in response to receiving the low power alert, to the network server, a message to cause the network server to perform power control of a neighboring base station to increase or decrease transmission power; and
   sending, from the network server, notifications to the mobile devices, the notifications configured to include human-readable information regarding the vehicle battery power level of the in-vehicle base station,
   thereby enabling the mobile devices to be notified via the network server when the vehicle battery power level is low.

6. The method of claim 5, wherein the notifications are short message service (SMS) messages or non-SMS text notifications or audio notifications.

7. The method of claim 5, further comprising initiating power control for neighboring nodes at the in-vehicle base station or at the network server.

8. The method of claim 5, wherein the vehicle controller network is a controller area network (CAN) bus.

9. The method of claim 5, wherein the request includes a projected time that the in-vehicle base station will be powered down.

10. The method of claim 5, further comprising sending, from the network server, periodic notifications to the mobile devices providing updates on a power status of a vehicle battery power level.

11. The method of claim 5, further comprising sending, from the network server, notifications to the mobile devices regarding an immediate shutdown of the in-vehicle base station.

12. The method of claim 5, wherein the notifications include information about whether connectivity will continue.

13. The method of claim 5, wherein the network server is a core network server, a gateway server between the in-vehicle base station and a core network, a coordinating server, or a proxy server.

14. The method of claim 5 further comprising communicating using an X2 protocol between the in-vehicle base station and the network server, communicating using the X2 protocol between the network server and other base stations or nodes, and communicating using an S1 protocol to handle mobility communications with a core network.

15. The method of claim 5, further comprising initiating, at the network server, a text message request via a short message service (SMS) gateway server, or initiating a text message request directly by creating an SMS request.

16. The method of claim 5, further comprising increasing a transmit power of a neighboring base station and initiating a handover of the mobile devices to the neighboring base station.

17. The method of claim 5, further comprising sending periodic notifications with updates on a power status of the in-vehicle base station, wherein the power status further comprises a battery percentage, a time remaining, or an immediate power-down status.

18. The method of claim 5, further comprising coordinating, if the in-vehicle base station has powered down or is in preparation to power down, an increase in transmission power for a neighboring base station, thereby extending a range of the neighboring base station to cover a gap in coverage created by powering down the in-vehicle base station.

\* \* \* \* \*